April 26, 1960 S. NEVILLE 2,934,182
THREADED SCREWS AND THE JOINING OF
PARTS BY MEANS OF THREADED SCREWS
Filed Jan. 16, 1956

INVENTOR
SIDNEY NEVILLE
ATTORNEYS

United States Patent Office 2,934,182
Patented Apr. 26, 1960

2,934,182
THREADED SCREWS AND THE JOINING OF PARTS BY MEANS OF THREADED SCREWS

Sidney Neville, Hale, England, assignor to Metropolitan-Vickers Electrical Company Limited, London, England, a British company Application January 16, 1956, Serial No. 559,357

Claims priority, application Great Britain January 18, 1955

6 Claims. (Cl. 189—36)

This invention relates to threaded screws and to the joining of parts by means of threaded screws. Whilst the joining of the parts is therefore of a mechanical nature its primary purpose may be to connect the parts mechanically or electrically together.

According to the present invention, a connection comprises two connected parts each having a preformed threaded tapered hole, the holes in said parts being aligned in said parts, and a tapered headless threaded screw driven into said holes so that the diametral clearance between the screw and said holes is taken up, the arrangement of the threads being such that the threads of the screw and said parts do not mesh exactly, resulting in the screw being in tension and the connection of the parts being preloaded in that said two parts are urged toward one another by the screw, the axial load being taken by the screw on its thread only. Since axial movement between the parts is resisted by engagement of the threads on the screw with the threads on each of said parts, it is therefore unnecessary to provide said screw or member with an external head for taking the axial separating load as is necessary in the commonly employed simple cylindrical bolts.

The invention also comprises further features as are set forth hereinafter and in the appended claims.

Arrangements according to the invention are therefore advantageous inter alia in constructions where the projection of a screw head beyond the surface of one of the parts to be joined is undesirable or inconvenient, and wherein the use of a screw head recessed into said surface is objectionable, for example in cases in which such recessing would unduly weaken said part mechanically.

Reference will now be made by way of example to the accompanying drawing, in which.

Figure 1:
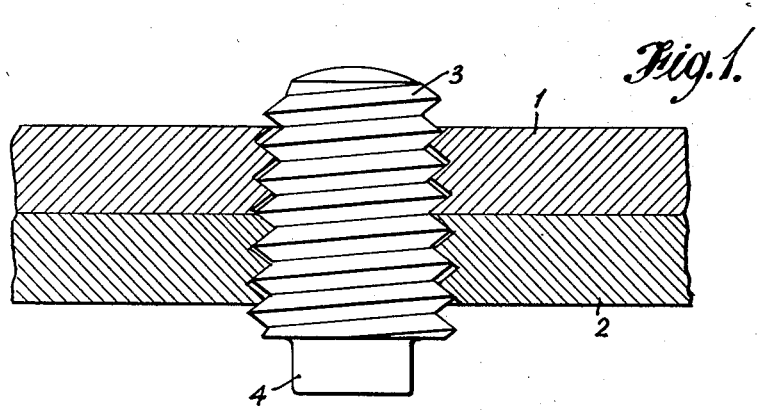
Figs. 1–3 illustrate respectively several embodiments of the invention.

In Fig. 1 two parts to be joined are illustrated by way of example as comprising plates shown partly at 1 and 2. In joining these parts according to the invention, a tapered hole having a uniform pitch screw thread is formed in the parts 1 and 2, whilst the latter are held in the illustrated relative positions which they are intended finally to occupy, namely in contact with one another in the example illustrated. Said hole may for example be formed by drilling a tapered hole of the required taper and subsequently tapping the thread therein.

Thereafter a correspondingly tapered screw 3 having a slightly smaller thread pitch than the thread in the parts is screwed into said holes until the thread of the screw fits so that diametral clearance is taken up. The screw is thus placed in tension and the connection of the parts 1 and 2 is thereby preloaded. Relative movement of the plates 1 and 2 both along the axis of the screw and transversely to said axis is prevented.

The screw may be formed in any suitable manner for the convenient driving thereof. In the example illustrated the larger diameter end of the screw is provided with a protruberance 4 of hexagonal, square or other form adapted to be operated by a spanner or other means. Alternatively, the screw may be provided with a slot or recess of hexagonal, square or other form constituting a driving socket.

Whereas in Fig. 1 the plates 1 and 2 are disposed in contact with one another, in Fig. 2 the thread pitch of the screw and the holes is the same and a shim 5, which may be of resilient or non-resilient material for purposes hereinafter indicated, is interposed between said plates.

The thread is of uniform pitch and may assume various V or like forms, adapted to the material employed, having the load bearing faces inclined from the plane perpendicular to the longitudinal axis of the screw, so that as the screw is rotated and the thread enters more deeply into the tapped holes a wedging action is produced tending to draw the two parts together.

Figure 4:
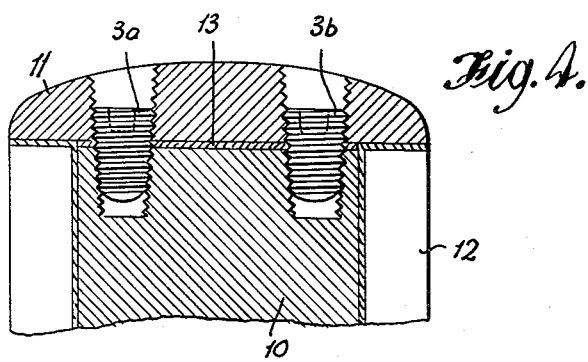
Fig. 4 is a fragmentary elevation to a smaller scale illustrating one application of the invention in a salient pole dynamo-electric machine.

The arrangement of thread faces just above referred to may be employed for compressing relatively thin material, such as the member 5 in Fig. 2, inserted between the two parts to be joined or for compressing an associated part or parts of relatively thin material such as in the application hereinafter to be described with reference to Figure 4.

In making the joint in the arrangements including the member 5, the insertion of the tapered screw will result in the tips of the thread on the screw engaging the tips of the threads in said holes, provided the separation between the parts produced by said material 5 is less than the pitch of the thread, and rotation of the screw will gradually pull the two parts together as the threads engage more deeply. As the threading of the screw into the tapered holes progresses, the area of the abutting surfaces between the threads increases so that the effective strength of the threads increases with the clamping force. The screw reaches final tension when the two parts are in the positions in which the holes were originally formed and tapped.

Figure 2:
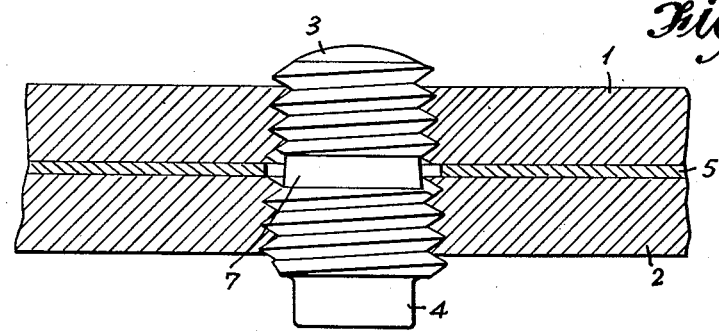

Resilient material, for example rubber, illustrated in Fig. 2 by the shim 5, may be inserted between the adjacent surfaces referred to either where the resilient material is an essential part of the structure or is employed for the purpose of producing the pressure referred to; for example such pressure may be provided for ensuring a good electrical contact through the screw. The resilient material, instead of being arranged between the surfaces referred to, may comprise a part surrounding or otherwise located in relation to one or more screws according to the invention, so that as the parts connected by the screws are subjected to the pressure referred to, said resilient material will be compressed.

As hereinbefore indicated, the thin shim of metal or other relatively non-resilient material may be inserted, after the formation of the tapped holes, between the two parts, such shim being again illustrated at 5 in Fig. 2. When the screw is inserted and driven home the screw will then be subject to tensile stress, whilst at the same time the surrounding material of the parts is to some extent compressed. This tension will be applied gradually during the last complete turn of the screw. The final combined strain in tension on the screw and compression on the parts depends on the thickness of the inserted thin shim or shims since there is no final thread clearance. The method of joining parts according to this feature of the invention is well adapted where it is required that the screws be pre-loaded in order that the two parts shall not separate under a specified working load along the axis of the screw. As is shown in Fig. 2, the screw thread may be separated into two parts by a plane portion 7 near the plane of contact of the two parts.

Figure 3:
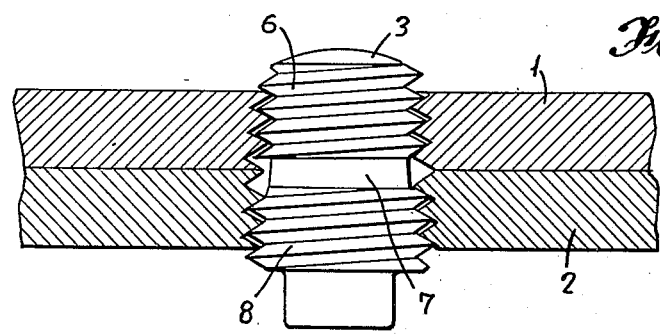

Pre-loading between the screw and the parts may be provided by two separately threaded regions 6 and 8 (Fig. 3) separated for example by a plain portion 7, with the distance between the threads tips of one region and those of the other region slightly less than a whole number of thread pitches.

It will be understood that in all the arrangements according to the invention, since the tapered screw is driven home so as to take up the diametral clearance between the threads, the screw is well adapted also for transmitting forces between the two parts in a direction or directions radially of the screw.

The tapered screws provided and employed according to the present invention have the further advantage that since the diametral clearance is taken up the screws are self-locking under variation or reversal of load. The maximum diameter of the screw may be such that when driven tightly home in the corresponding part, the larger end will be flush or even slightly below the outer surface of said part.

It will be understood that in the arrangements according to the invention, the screw and the tap employed for forming the threaded holes may in general have the same taper, pitch, and thread form as one another, but the tap and screw may differ from one another in one or more of these respects, such as for the purpose hereinbefore indicated; the thread characteristics, which may be uniform throughout the length of the screw or may be different at different parts of the latter such as hereinbefore indicated, may assume various forms according to requirements.

It is contemplated, however, that in carrying out the invention the taper of the screw will be relatively slight and the pitch of the threads relatively fine, for example a taper of the order of one in sixteen on diameter may be employed, whilst the length of the screw will generally be several times the diameter thereof. It will be understood that the pitch of the thread will be made at least as great as the amount by which any resilient material in the structure is to be compressed on assembly. Furthermore, the necessary degree of taper is dependent upon the fraction of the thread pitch required to be used in compressing such resilient material. In cases where the full pitch must be used in this manner, the screw must taper by at least the depth of the thread in the length of engagement of the screw in the smaller end of the hole in which it is received.

Whilst it is to be understood that the arrangements and methods according to the invention have an unrestricted general application, several arrangements and applications of the invention will now be briefly described by way of example as applied more particularly for use in rotor constructions in dynamo-electric machines.

In one application the invention is applied in place of the usual shaft coupling bolts in vertical shaft alternators such as water-wheel alternators, wherein the bolts are required not only to transmit the torque to the alternator rotor, but also to support a large axial load. In such applications it is desirable that the bolts be preloaded commensurately with said axial load. For this purpose the method hereinbefore set forth employing a thin metal shim may be employed to obtain the pre-stressing. The tapered screws, although stretched by the use of such shim, can still be arranged to fit tightly on diameter for transmitting the rotational movement required of the coupling and this fit is obtained without the necessity for the pressing-in operation and equipment normally employed where fitted parallel bolts are used. Where the tapered screws according to the invention are employed for a shaft coupling without projecting heads then the need for a shroud or cover over the bolt-heads is avoided.

In another application of the screws according to the invention, the latter are employed for attaching fan blades of light alloy to a steel ring. The use of fixing bolts or screws of the normal type having heads recessed into the blades renders locking of the screws or bolts difficult as a result of the comparatively soft metal in which the blades are formed.

In another application of the invention, the screws are employed for providing a removable electrical connection between two separated conductors either with or without interposed resilient material, for example in electrical instruments or in electrical busbar installations.

It is also contemplated that the invention may have important application in for example, shipbuilding and structural steelwork.

The methods hereinbefore set forth wherein a thin shim is employed are useful for securing solid pole shoes to the poles of alternators. Fig. 4 illustrates one such application of the invention, wherein one pole of an alternator is partly shown in section. The upper part of the pole shank appears at 10 and has attached thereto a separate pole shoe 11. The upper part of the coil surrounding the pole shank appears at 12. The shoe 11 is secured to the shank 10 by a plurality of tapered screws, such as shown at 3a and 3b, in accordance with the invention. A thin metal shim 13 provides pre-loading of the screws, in the manner hereinbefore indicated, commensurate in magnitude with the centrifugal force on the pole shoes. Since the tapered screws are smaller than the diameter of a recessed bolt-head of normal type, said screws may be arranged so as to be fully recessed below the pole profile as shown. Consequently it is possible for the pole-shoe profile to be finished before being mounted on the rotor. In such applications the pole shoes 11 may serve to clamp the field coils in place and the screw threads can be selected appropriately for the amount of bedding-down normally required.

In the case of field coils in comparatively large machines the amount of bedding-down may amount approximately to one-sixteenth inch either after the application of temporary clamps or over the whole of the bedding-down operation. For this purpose it is contemplated that a pitch of about ten threads per inch will have advantages. The pitch may be uniform through a range of bolts between one inch and two inches in size as are commonly required for large alternators. The screws may be provided in standard lengths which may be for example of the order of three to four times the diameter as measured at a specified gauge point, and the thread may taper, for example, about one in sixteen in diameter.

Using the standard form of Whitworth thread, screws proportioned as above indicated, would provide a bedding-down or stretch of .005 inch per turn so that a field coil would be bedded-down by one sixteenth inch in twelve and a half turns. For pre-loaded bolts using this pitch and thread form a shim .005 inch thick would provide pre-stressing to 40,000 lbs. per square inch in the case of a screw having an effective length of 3.75 inches. A similar effect may be obtained without the necessity for a shim by providing a phase difference of one-twentieth of, or other fraction of, a turn between the threads at the larger and smaller ends of the screw respectively, or by adopting fractionally different thread pitches for the screw and the tapped holes, thread pitches of for example ten and one-seventy-fifth threads per inch and ten threads per inch for the screw and the tapped holes respectively.

In forming the screw threads by means of a taper thread tap the final movement of the tap will leave a slight step in each thread at the point at which the tapping is stopped. The rate of feed with the threads referred to would be .003 inch per revolution and a step of this amount would be acceptable in most ordinary applications. Since the tapping process is automatically limited when the full thread depth is reached, then in order to secure uniform position of the screws when tightened the depth of the tapered drilled hole must be accurately gauged. If necessary, in place of a single full-depth tap being employed various sequence-cutting schemes may be used with a view to reducing the maximum tapping torque required.

In order to avoid the step above referred to or in other applications where necessary, such as for large diameter holes, the taper threads required according to the invention may be cut or at least finished by employing a set of chasers arranged in a plug adapted to be rotated in the hole so that said chasers slide in grooves arranged on axial planes of said plug and converging towards the axis of the plug; the plug will be suitably registered from the top or bottom of the hole. By this means, a smoothly finished thread may readily be made.

What I claim as new and desire to secure by Letters Patent of the United States is:

1. A connection comprising two connected parts each having a preformed threaded tapered hole, the holes in said parts being aligned in said parts, and a tapered headless threaded screw driven into said holes so that the diametral clearance between the screw and said holes is taken up, the arrangement of the threads being such that the threads of the screw and said parts do not mesh exactly, resulting in the screw being in tension and the connection of the parts being preloaded in that said two parts are urged toward one another by the screw, the axial load being taken by the screw on its thread only.

2. A connection of two parts as claimed in claim 1, in which the thread pitch of the holes is the same in both of said parts and the thread pitch of said screw is slightly smaller than the pitch of the thread in said parts.

3. A connection of two parts as claimed in claim 1, in which said screw comprises two separately threaded regions, the distance between the thread tips of one region and those of the other region being slightly less than a whole number of thread pitches.

4. A connection of two parts as claimed in claim 1, in which said screw comprises two separately threaded regions engaging respectively with the threads in said parts and having a phase difference between the threads of said regions equal to a fraction of the thread pitch.

5. A connection of two parts as claimed in claim 1, in which the threads of said parts and said screw are identical, and including a resilient shim interposed between the two parts so that the threads of said parts and screw do not mesh exactly.

6. A connection of two parts as claimed in claim 1, in which the threads of said parts and the screw are identical, and including a shim interposed between said parts so that the threads of said parts and the screw do not mesh exactly.

References Cited in the file of this patent

UNITED STATES PATENTS

| | | |
|---|---|---|
| 63,021 | Collins | Mar. 19, 1867 |
| 83,225 | Tudor | Oct. 20, 1868 |
| 377,188 | Burdick | Jan. 31, 1888 |
| 459,954 | Barrow | Sept. 22, 1891 |
| 733,915 | Pike | July 14, 1903 |
| 909,720 | Webb | Jan. 12, 1909 |
| 1,299,232 | Rosenberg | Apr. 1, 1919 |
| 1,835,243 | Schaffert | Dec. 8, 1931 |
| 2,167,558 | Upson | July 25, 1939 |
| 2,250,343 | Zigler | July 22, 1941 |
| 2,271,796 | Eckman | Feb. 3, 1942 |

FOREIGN PATENTS

| | | |
|---|---|---|
| 19,933 | Denmark | Feb. 25, 1915 |
| 687,622 | Great Britain | Feb. 18, 1953 |